Wood & De Vaughan,
Scroll Sawing Machine.
N° 15,790. Patented Sep. 23, 1856.
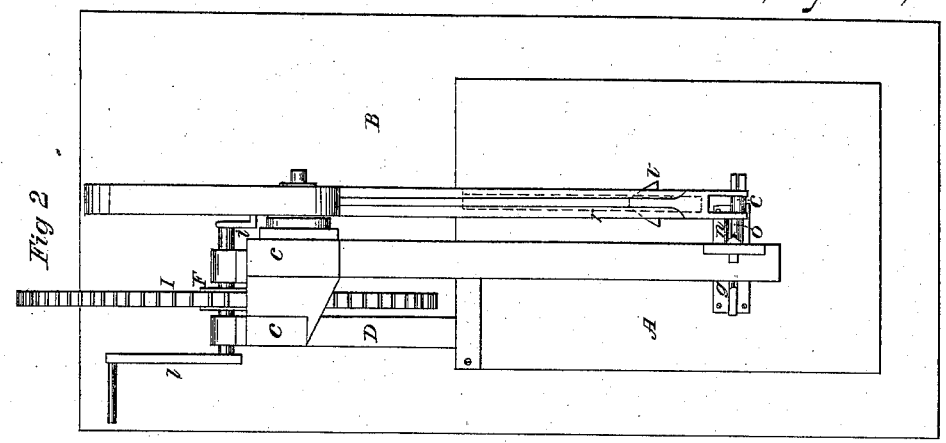
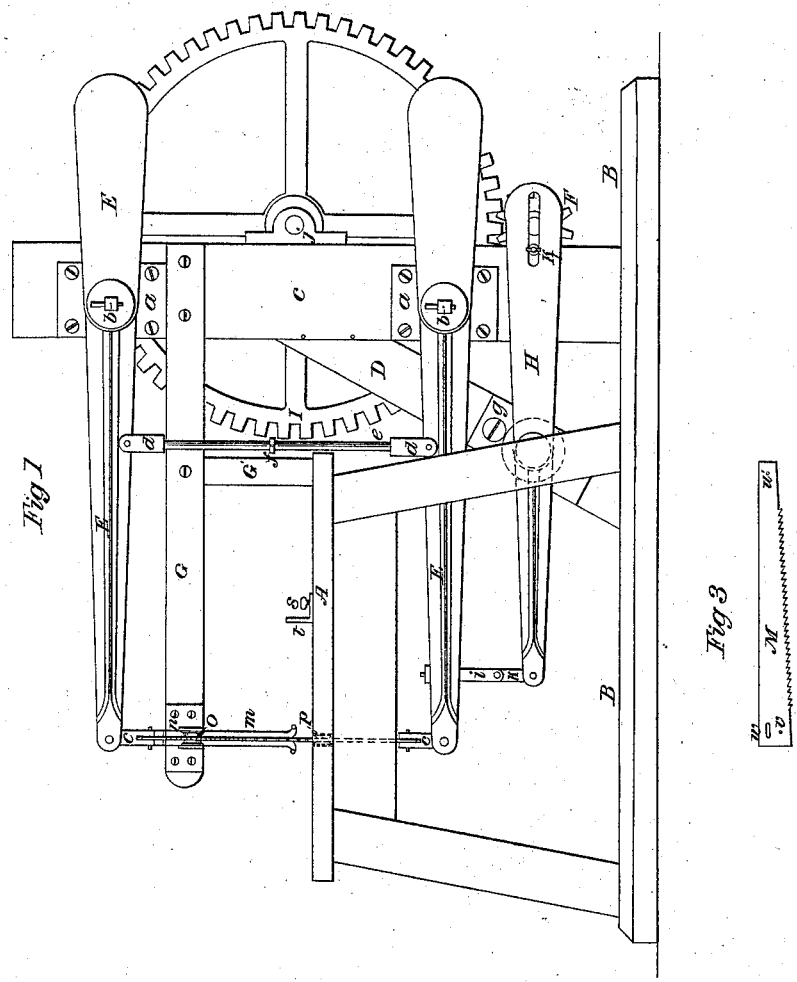

UNITED STATES PATENT OFFICE.

WM. P. WOOD AND SAML. DE VAUGHAN, OF WASHINGTON, DISTRICT OF COLUMBIA.

SAWING-MACHINE.

Specification of Letters Patent No. 15,790, dated September 23, 1856.

*To all whom it may concern:*

Be it known that we, WILLIAM P. WOOD and SAMUEL DE VAUGHAN, of the city and county of Washington, in the District of Columbia, have invented a new and useful Improvement in Sawing-Machines of which the following is a full, clear, and exact description, reference being had to the accompanying drawing of the same, in which—

Figure 1, represents a side elevation of a machine embracing our improvements; Fig. 2, a plan of the same; and Fig. 3, a side elevation of our improved saw blade.

We are aware that rocking beams have heretofore been used with a link or connecttion to saw gates, traveling in guide ways, but these have been so unwieldy and expensive as to preclude their adaptation to ordinary shop use; besides the suction and friction attendant on the working of machines so constructed has been found so great as to render it impossible to operate them to any advantage by hand power; to obviate these difficulties and remedy these objections constitute the first branch of our improvements to accomplish which we take two beams of equal length from center of beam to center of swivel bearing, or if one saw is sufficient (which is preferable) of equal weight on each side of the axis of the beam, these axes of the beams must be in a vertical line with each other, and the axes of the swivel bearings in a horizontal line with the axes of the beams, this done we have found that if a vibratory motion equal to one sixth of the distance from the axis of the beam to the axis of the swivel bearing be communicated to the beam, that it will describe the greatest stroke possible that can be given to the saw consistent with a vertical or even cut; and which is sufficiently accurate for all practical purposes;—some may contend and it cannot be controverted that for light work a short stroke and fast motion will produce better and more accurate sawing, while this may be the case it is still absolutely essential that a certain amount of stroke should be given to give the saw blade the requisite feedage and freeage. Such being the case we have found it necessary to employ the greatest amount of stroke which can be accurately given by our method to the beams, so that manual power can be successfully employed, thus remedying the difficulties which have heretofore rendered this class of machines inoperative.

The second branch of our improvements consists in so arranging the parts of a light sawing apparatus as to occupy but a small space and admit of the saw table being made of a suitable height for the operator, and also to allow the crank of the driving wheel to be placed at such a height and position as will be most convenient and easy for the person driving it. To do this we employ a third beam or lever, balanced and fixed to a suitable center, free to turn on its axis having a groove or slot in one end in which the crank pin of the pinion plays, thus giving the lever beam a reciprocating motion, the other end of which is connected to the saw beam so as the motion of the one will operate the other; the wrist pin of the crank being provided with a roller to diminish the friction on the side of the slot.

The third branch of our improvements consists in a cheap durable and easily regulated arrangement for straining the saws, which we accomplish by having the axis of the saw beams permanently fixed, and placing at suitable distances in the beams, swivel connections either or both having screw threads cut thereon, by which with the employment of a metallic rod, with a screw thread cut on one or both ends the beams can be forced apart thereby straining the saw to any degree of tension required.

The object of the fourth branch of our improvements is to remedy an evil which has heretofore existed in all light sawing, and which arises from the saw blades generally used for such purposes being made so narrow as to lack rigidity they varying from ¼ to ½ inch only in breadth (seldom exceeding the latter) in consequence of which in cases of irregularity of feed of stuff or knots or other irregularities therein these saws frequently become twisted and break, and are always liable to deflection from the front (teeth) to the back of the blade causing unevenness and irregularity in curvilinear or scroll and other sawing, to remedy which we employ fluted or grooved feed rolls, which it will readily be perceived will prevent any rearward deflection of the saw, thus guarding against improper feed of stuff occasioned either by irregularity of feeding, knots or irregularities in the grain of the wood being sawed.

The fifth branch of our improvements consists in constructing a saw blade of such a shape as to render it capable of ripping (or straight sawing) while it is cheap, durable, and effective; to do this we form the blade of a wedge shape with a slot running lengthwise, and on a line with the eye on the lower end of the saw and parallel with the back thereof; this position must be preserved so that the back of the saw blade can play truly through the feed rollers, thus causing the front or teeth side of the saw to form an angle to the back. The saw blade is also provided with an eye near the front or cutting part of the blade forming its straining eye, the pin which passes through this eye resting on the L shaped piece or stem of the swivel bearings, while the pin which passes through the slot of the saw blade acts as a guide for the back, making the line of the straining of the saw blade the same with reference to the front as if the blade was of the usual shape.

In the accompanying drawing (A, A,) represents the saw table erected upon a flooring (B,) from which arise two standards (C,) each of which are supported upon that side next the saw table by braces (D). To the side of the main standard (C) are secured at suitable distances apart according to the length of the saws to be used two plates (a,) having studs or axial pins (b,) secured thereto, in such manner that the upper pin or axis shall be in a vertical line with the other. Upon these pins or axes are mounted horizontal rocking beams (E) of equal length in one direction from the center of their axes (b) to the center of the axis of the swivel bearings (c) to which the saw is connected. The other end of these beams being extended and weighted sufficiently to counterbalance the weight of the other. Or instead of being weighted as described they may be extended to a length equal to the other ends, and have a saw attached in the same way as the others, but we prefer the former, as it is but seldom that two saws will require to be operated at one and the same time, and further because that we would be compelled to use a different mode of straining than what we at present intend to use. And it may here be observed that these beams may have a long and short end, so that the same machine may have a saw cutting with a long stroke at one end, and a short one at the other so as to adapt it to such purposes as would require a long or short stroke, it being absolutely necessary at all times for the saw to have a stroke sufficient at once for feedage and freeage, coarse or heavy work requiring a proportionately longer stroke for this purpose than light or fine work. But wherever the ends of the beams are made of different lengths it will be better to make the short arms proportionately heavier so as to counterbalance the weight and leverage of the other, which will have the effect of causing the machine to work more evenly and regularly, and exert less strain upon the operator. These beams are so mounted upon their axes that the mean line between their highest and lowest stroke shall be a horizontal one, their highest stroke above that line being equal to one twelfth of their length from the center of their working axis to the center of the swivel bearings to which the saw is connected; and their lowest below the horizontal line the same, making the full stroke equal to one sixth of the length of the beam from its own axis to that of the swivel bearing, this being found to be the maximum stroke that can be given consistently with the saw traveling in a vertical line, or at least as nearly so as is required for all practical purposes, the axes of the swivel bearings being in a horizontal line with the axes of the beams.

To the under side of the upper beam, and upper side of the lower beam and at equal distances from the axes of these beams are attached swivel connections (d), to the lower of which is connected the end of a rod (e) in such manner as to be free to turn therein, the upper end of this rod having a screw thread cut thereon which takes into a female screw cut through the under side of the upper swivel connection (d) or if thought advisable both ends may have threads or right and left screws cut thereon, and operate in the same manner as the latter; upon this rod is secured a thumb piece (f) by which it can be turned, for the purpose of straining or unstraining the saw as may be desired; this being effected in the former case by so turning the rod as to force the beams (E) apart; and in the latter by turning it in the opposite direction. The rod being thus mounted between swivel connections that it may accommodate itself to the motion of the beams. Motion being communicated to the latter through the medium of a balanced beam (H) mounted at its center upon an axis secured to a plate (g) on the side of the brace (D), and having a slot in one end in which the wrist pin (h) plays, of a crank (i) secured to a pinion (E) mounted in suitable bearings in the standard (C) and gearing into a driving or master wheel (F) from which it receives motion, the latter being driven from a crank secured upon its shaft; the wheel (F) being also mounted and working in bearings or boxes (y') secured to the standard (C) between which it works.

The length of the crank (i), upon the wrist pin of which is mounted a roller to diminish the friction is always proportioned to the length of the other end of the driving beam, so that supposing the latter to be three feet in length from its axis to the axis of its swivel joint (k) which connects it with the lower saw rocking beam (E) at a point distant from its swivel bearing of a foot, making those beams four feet long from their axis to the axis of their swivel bearings, then the length of the crank (i) must be of a length equal to one twelfth part of the length of the beam (H) or three inches, so that its downward stroke shall raise the beam three inches above the horizontal line, and its upward stroke depress it to the same distance below; making the full stroke of the beam (H) every revolution of the crank, six inches or equal to one sixth part of its length; or equal to eight inches of the beams (E) they being one foot longer, and it connected to the lower one at the distance of a foot from its swivel bearing, and so on in the same manner with any other length of beams used. The beam (H) may be dispensed with entirely and the crank operate directly upon the lower beam (E) but the object of using it is to prevent the crank (l) of the driving wheel being raised too high for the convenience of the operator, although if thought advisable a stool or stand may be used to obviate this difficulty, but it is thought preferable for various reasons to use the former.

The connection between the lower saw beam (E) and driving beam (H) is formed by a swivel joint link (k) pivoted at its lower end to the beam (H) and connected at its upper end to a forked rod (l') secured to the lower beam (E) by means of a nut.

Upon and near the upper extremity of the main standard (c,) between the upper beam (E) and the saw table (A,) is secured a suspension beam (G,) supported near its middle by a brace (G') whose lower end is secured to the rear side of the saw table. Near the extremity of this beam is cut a mortise through which is passed the end of an adjustable upper timber guide (n) having forked arms on its lower extremity between which the saw blade operates; the object of this guide is to prevent the article being sawn from springing or raising as the saw is raised or from other causes. Immediately in front of this guide is secured to the beam a bracket (n) between whose arms is mounted the shaft of a grooved or fluted feed rool (o,) another (p',) being mounted in the same vertical line between the sides of the slot (q) in the saw table in which the saw plays, the object of which with a common whip saw is to prevent the blade from being sprung or twisted to which it is exceedingly liable from the irregularity of feed arising from knots and other irregularities in the grain of the wood; but it is more especially adapted and intended to be used in connection with the improved saw blade invented by us, for the use of this machine whereby we are enabled to rip out light stuff faster and better than has ever been done or claimed for any other hand sawing machine before. This saw blade (M) Fig. 3, is of a wedge shape, that is to say the tooth or front side is set at an angle to the back, and so hung to the bearings by means of a slot (a) and eye (u') that the back shall be perpendicular or at right angles to the horizontal line of the beams (E) while the teeth shall make an angle thereto less than a right angle, thus giving pitch to the saw, the feed rolls (o and p), as it is operated causing it to take a bite or cut equal to the angle at which the teeth are set. The blade being strained and steadied by a pin passing through an eye (v) nearer the front or tooth side of the blade, and the forks of the swivel bearing.

Through the upper side of the saw table is cut a slot (r) in a line at right angles to the teeth of the saw forming a guide way for a sliding adjustable carriage (t) to the front of which is secured a guide against which in cases of plain or straight sawing, the timber being sawed is pressed, which serves as a guide to it. This carriage is made adjustable so that it can be readily set to any required width by means of a set screw (s) and clamped plate on the under side of the table.

Having thus described our invention what we claim as new and desire to secure by Letters Patent, is

1. We claim the arrangement of the driving beam (H) in combination with the rocking-beams (E) in the manner substantially as and for the purposes set forth.

2. We claim the arrangement of the fluted feed rolls (o and p) in combination with a reciprocating wedge shaped saw blade substantially as and for the purposes described.

3. We claim the wedge shaped saw blade (M) when constructed and operated in the manner and for the purposes set forth.

In testimony whereof we hereunto subscribe our names.

WILLIAM P. WOOD.
  SAML. DE VAUGHAN.
In presence of—
 ARTH. C. WATKINS,
 P. HANNAY.